(12) United States Patent
Hershey

(10) Patent No.: US 9,347,847 B2
(45) Date of Patent: May 24, 2016

(54) PRESSURE TRANSMITTER WITH IMPULSE LINE PLUGGING DIAGNOSTIC

(71) Applicant: HONEYWELL INTERNATIONAL INC., Morristown, NJ (US)

(72) Inventor: George Hershey, Blue Bell, PA (US)

(73) Assignee: Honeywell International Inc., Morristown, NJ (US)

( * ) Notice: Subject to any disclaimer, the term of this patent is extended or adjusted under 35 U.S.C. 154(b) by 165 days.

(21) Appl. No.: 14/463,344

(22) Filed: Aug. 19, 2014

(65) Prior Publication Data

US 2016/0054190 A1 Feb. 25, 2016

(51) Int. Cl.
*G01L 19/00* (2006.01)

(52) U.S. Cl.
CPC .................... *G01L 19/0092* (2013.01)

(58) Field of Classification Search
None
See application file for complete search history.

(56) References Cited

U.S. PATENT DOCUMENTS

| 6,119,047 | A | 9/2000 | Eryurek et al. |
| 7,650,245 | B2 | 1/2010 | Hashizume et al. |
| 7,949,495 | B2 | 5/2011 | Wiklund et al. |
| 2004/0249583 | A1* | 12/2004 | Eryurek .................. G01F 1/363 702/47 |
| 2005/0097963 | A1* | 5/2005 | Wilda .................... G01L 13/025 73/716 |
| 2006/0206288 | A1* | 9/2006 | Brahmajosyula ......... G01F 1/40 702/183 |
| 2016/0047681 | A1* | 2/2016 | Zhang ....................... G01F 1/42 73/861.61 |

FOREIGN PATENT DOCUMENTS

| WO | WO 2009048789 A1 * | 4/2009 | ............ G05B 23/024 |
| WO | WO 2015131307 A1 * | 9/2015 | ................ G01F 1/34 |

* cited by examiner

*Primary Examiner* — Andre Allen
(74) *Attorney, Agent, or Firm* — Jetter & Associates, P.A.

(57) ABSTRACT

A pressure transmitter includes at least one impulse line for coupling a fluid pipe or tank to a pressure sensor that measures a process pressure of a process fluid, a temperature sensor measuring an ambient temperature, and a processor accessing baseline data for the process pressure and ambient temperature. The processor implements an automatic impulse line plugging diagnostic (ILPD) algorithm stored in memory. The processor runs the ILPD algorithm implementing utilizing process measurements including a process pressure from the pressure sensor and an ambient temperature from the temperature sensor, comparing a magnitude of the process pressure to a baseline pressure predicted from the baseline data corresponding to the ambient temperature, and uses results of the comparing to determine whether the impulse line is plugged. The comparing can involve comparing a process pressure change to a baseline pressure change predicted corresponding to an ambient temperature change.

15 Claims, 4 Drawing Sheets

DIFFERENTIAL PRESSURE TRANSMITTER DIAGNOSTIC

| AMBIENT TEMPERATURE | DIFFERENTIAL PRESSURE OUTPUT | HP IMPULSE LINE PLUGGED | LP IMPULSE LINE PLUGGED |
|---|---|---|---|
| INCREASING | NORMAL (BASELINE PERFORMANCE) | NO | NO |
| DECREASING | NORMAL (BASELINE PERFORMANCE) | NO | NO |
| INCREASING | DECREASE GREATER THAN BASELINE | LP OR BOTH HP & LP PLUGGED | |
| DECREASING | INCREASE GREATER THAN BASELINE | LP OR BOTH HP & LP PLUGGED | |
| INCREASING | INCREASE GREATER THAN BASELINE | HP OR BOTH HP & LP PLUGGED | |
| DECREASING | DECREASE GREATER THAN BASELINE | HP OR BOTH HP & LP PLUGGED | |

FIG. 3A

GAUGE OR ABSOLUTE PRESSURE TRANSMITTER DIAGNOSTIC

| AMBIENT TEMPERATURE | PRESSURE OUTPUT | IMPULSE LINE PLUGGED |
|---|---|---|
| INCREASING | NORMAL (BASELINE PERFORMANCE) | NO |
| DECREASING | NORMAL (BASELINE PERFORMANCE) | NO |
| INCREASING | DECREASE GREATER THAN BASELINE | NO |
| DECREASING | INCREASE GREATER THAN BASELINE | NO |
| INCREASING | INCREASE GREATER THAN BASELINE | YES |
| DECREASING | DECREASE GREATER THAN BASELINE | YES |

FIG. 3B

PRESSURE TRANSMITTER WITH IMPULSE LINE PLUGGING DIAGNOSTIC

FIELD

Disclosed embodiments relate to pressure transmitters having impulse line plugging diagnostics.

BACKGROUND

Blockage in impulse lines of a pressure transmitter may occur because dirt or other material in the process may settle in the impulse line(s) during operation. Typical types of blockages include, for example, solid depositions, wax depositions, hydrate formation, sand plugging, gelling, frozen process fluid plugs, as well as air or foam pockets.

Even when the impulse line or at least one of the impulse lines for a differential pressure transmitter become plugged, the pressure transmitter will generally continue to operate without any indication of the plug. However, the plug can cause erroneous pressure output measurements which can lead to undesired control actions taken by the control operator in the control room responsive to the erroneous pressure measurements. Identifying this error condition is known to generally require manual intervention at the installation site by a service technician. One known automatic plug diagnostic method for a differential pressure transmitter compares a unique noise signature in its output signal obtained during normal process operation with the noise signature of suspected plugged impulse line(s), where the noise in the output signal is known to typically be reduced when the impulse line(s) are plugged.

SUMMARY

This Summary is provided to briefly indicate the nature and substance of this Disclosure. It is submitted with the understanding that it will not be used to interpret or limit the scope or meaning of the claims.

Disclosed pressure transmitters having automatic impulse line plugging diagnostics and related methods recognize known automatic plugging diagnostic methods for pressure transmitters that utilize noise signatures in its output signal as described above require multiple input parameters under varying conditions of process flow. Relying on multiple input parameters under varying conditions of process flow, such known plug diagnostic methods can send false alerts (e.g., to a control room operator) as variations in process flow generally occur during normal system operation.

Disclosed pressure transmitters include automatic impulse line plugging diagnostic (ILPD) algorithms which utilize ambient temperature (e.g., ambient temperature changes) associated with the process pressure (e.g., process pressure changes) in its impulse line(s) to the process (e.g., a tank, pipe or other process connection to provide diagnostic alerts regarding plugs in the impulse line(s). The term "ambient temperature" as used herein refers to the temperature of the environment surrounding the impulse line(s). If a process pressure at some time ($t_1$) is larger in magnitude (by a predetermined amount or is outside a pressure limit set) as compared to a baseline process pressure corresponding to an ambient temperature at previous time $t_0$ obtained from stored baseline process pressure versus ambient temperature data, then a plugged impulse line can be automatically determined. As noted above, one embodiment utilizes ambient temperature changes and process pressure changes with baseline data to determine whether there is a plugged impulse line(s). Disclosed embodiments apply to both digital output pressure transmitters and analog output pressure transmitters.

Baseline process pressure for the pressure transmitter as a function of ambient temperature can be obtained empirically at the time of system installation or after cleaning of the impulse line(s) to obtain baseline data that is essentially plug-free. It may be possible for simulation to be used as an alternative to data taking provided the temperature change can be simulated. For differential pressure transmitters, the direction of a pressure change (positive or negative) in relation to the direction of the corresponding ambient temperature change is recognized to indicate which of the differential pressure transmitters' impulse lines (high pressure (HP) or low pressure (LP)) is plugged. Disclosed methods can be utilized independently or in conjunction with known methods to eliminate false alerts, such as with the noise signature method described above.

BRIEF DESCRIPTION OF THE DRAWINGS

FIGS. 3A and 3B show how disclosed ILPD algorithms can diagnose a plugged impulse line in a liquid process media by relating a significant pressure change to measured changes in ambient temperature for a differential pressure-based transmitter in FIG. 3A, and gauge or absolute pressure-based transmitter in FIG. 3B, according to example embodiments.

DETAILED DESCRIPTION

Figure 1A:
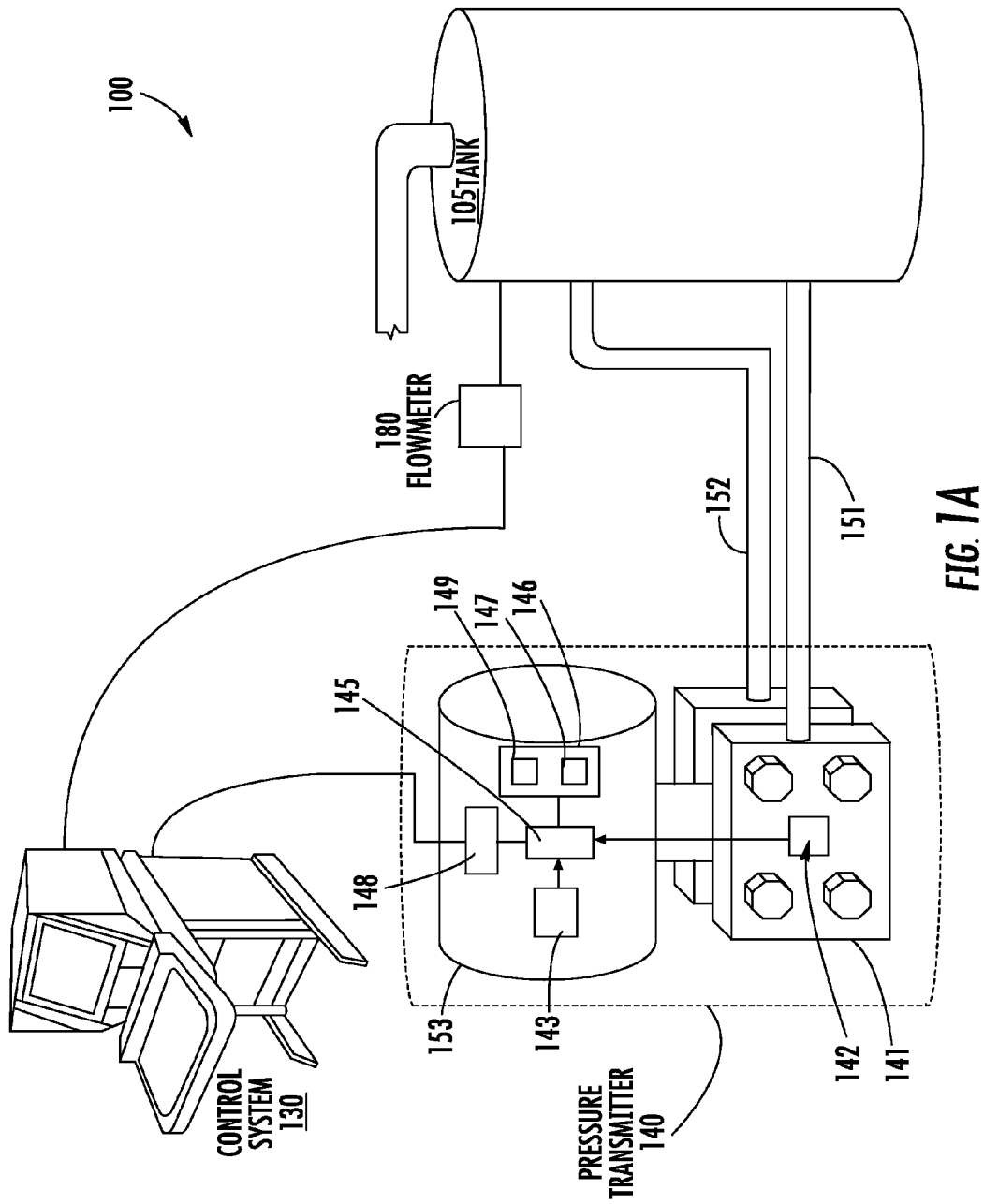
FIG. 1A is a depiction of a disclosed pressure transmitter having an automatic impulse line plugging diagnostic in a simplified control system controlling fluid processing of a process fluid in a tank, according to an example embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

FIG. 1A is a depiction 100 of a disclosed pressure transmitter 140 having automatic impulse line plugging diagnostic in a simplified control system 130 controlling fluid processing of a process fluid in a tank 105, according to an example embodiment. As noted above, disclosed embodiments are not limited to tank applications, and can also be used for fluid pipes (see FIG. 1B described below) or other process connections such as unique process connections. Pressure transmitter 140 can be an analog output or a digital output pressure transmitter, and includes an electronics housing 153 with a temperature sensor 143 therein, and an outer pressure case 141 with a pressure sensor 142 therein, where at least one impulse line shown as lines 151 and 152 couple the pressure case 141 to the tank 105. The pressure sensor 142 is configured to measure a process pressure of the process fluid. The pressure sensor 142 can be a gauge, absolute or differential pressure sensor, and comprise a diaphragm-based piezoresistive, capacitance, or other known type of pressure sensor.

The temperature sensor 143 is configured for sensing an ambient temperature, which is generally an integral temperature sensor being within the electronics housing 153. Temperature sensor 143 can continuously measure the air temperature around the pressure transmitter 140 which approximates the temperature of the environment surrounding the impulse line(s) 151, 152 referred to herein as the "ambient temperature".

The pressure transmitter 140 includes a processor 145 accessing baseline data 149 for the process pressure and ambient temperature stored in at least one associated memory shown as memory 146. The processor 145 is coupled to an output of the pressure sensor 142 to receive the process pressure and to an output of the temperature sensor 143 to receive the ambient temperature and implement a disclosed ILPD algorithm 147 stored in the memory 146. The output of the processor 145 is shown coupled to a transmitter 148 which is coupled to at least one control computer in the control system 130. Although the coupling is shown as being wire or cable, the pressure transmitter can include an antenna to support a wireless connection with the control system 130.

Although not shown, there is generally an analog-to-digital converter (ADC) between the output of the pressure sensor 142 and processor 145, and between the output of the temperature sensor 142 and processor 145, and a digital-to-analog converter (DAC) between the output of processor 145 and transmitter 148 when the pressure transmitter 140 comprises an analog output pressure transmitter. The control system 130 uses signals from pressure transmitter 140 to control a setting for a flowmeter shown as flowmeter 180 which controls a flow of a fluid into the tank 105. An operator may be associated with the control computer shown in control system 130.

Figure 1B:
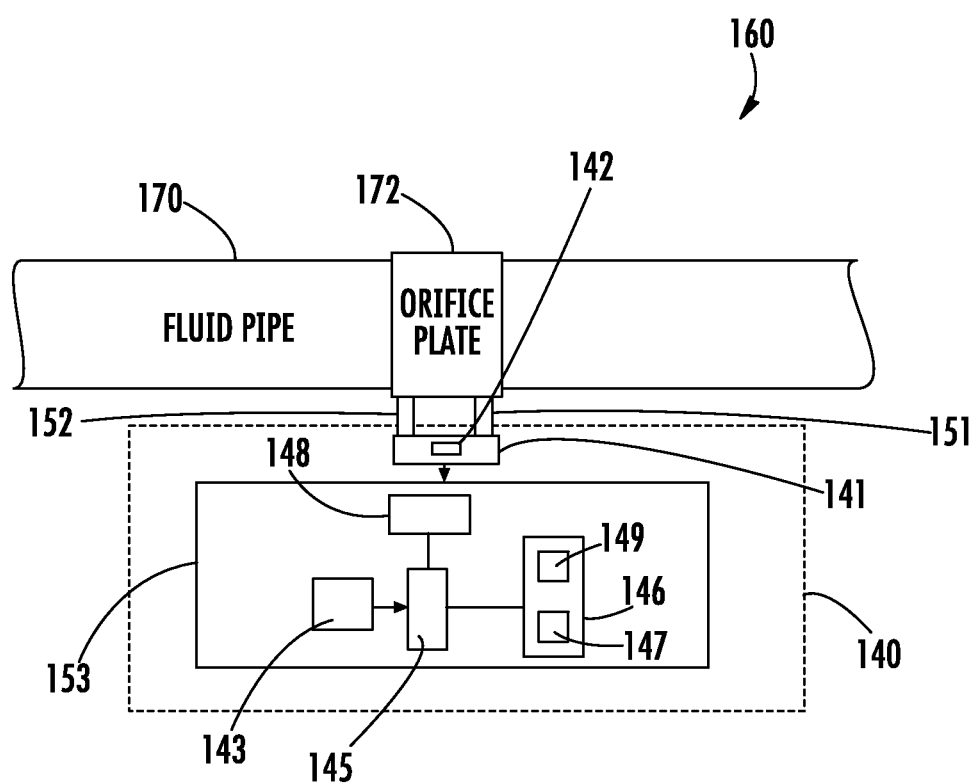
FIG. 1B is a depiction of a disclosed pressure transmitter having an automatic impulse line plugging diagnostic coupled by an orifice plate of a fluid pipe, according to an example embodiment.

FIG. 1B is a depiction 160 of a disclosed pressure transmitter 140 having an automatic impulse line plugging diagnostic coupled by lines 151, 152 to an orifice plate 172 of a fluid pipe (or line) 170, according to an example embodiment. Pressure transmitter 140 can detect plugging in line 152 (e.g. HP side impulse line) or line 151 (LP side impulse line 152), which can be respectively arranged at a front stage (HP side) and a rear stage (LP side) of the orifice plate 172 provided in fluid pipe 170 associated with a plant or the like.

Figure 2:
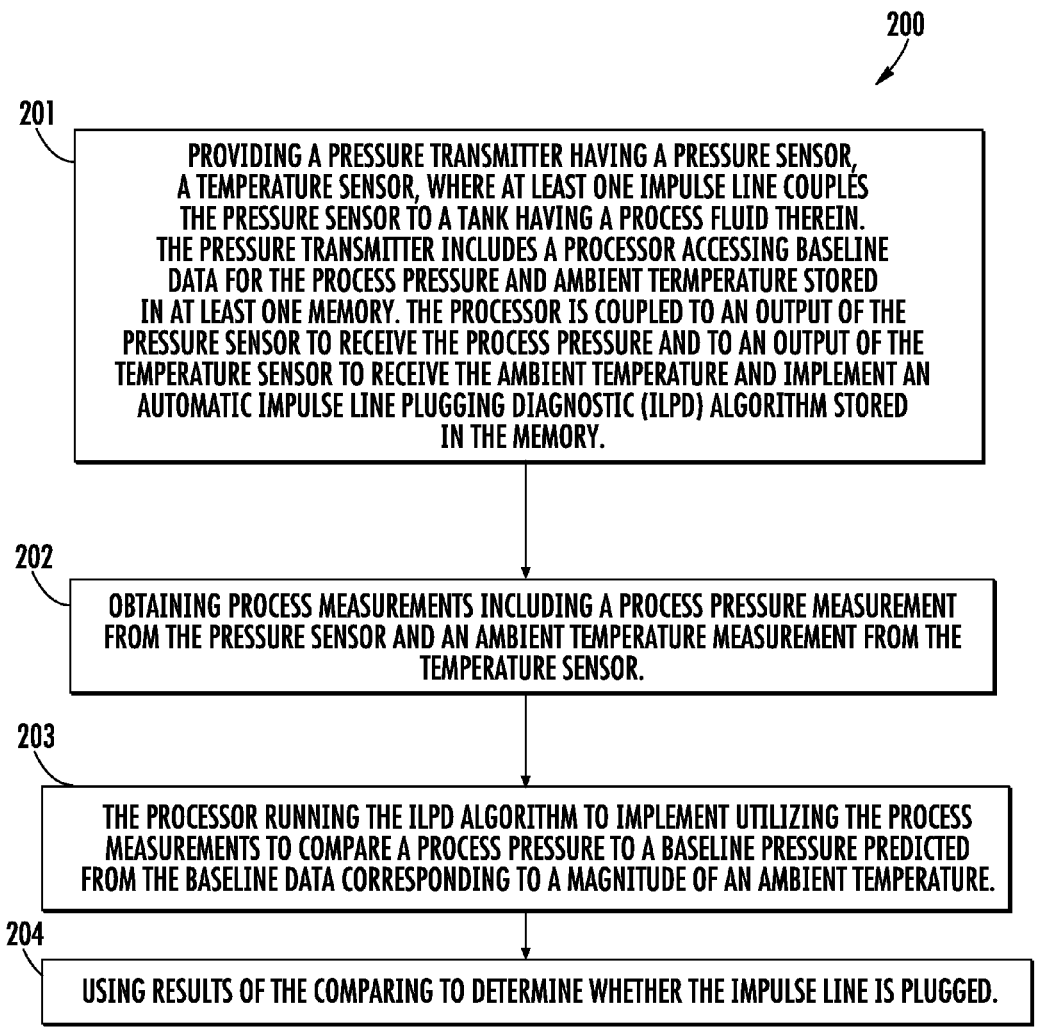
FIG. 2 is a flowchart for an example method of diagnosing plugging of an impulse line coupling a pressure transmitter to a tank or pipe, according to an example embodiment.

FIG. 2 is a flowchart for an example method 200 of diagnosing plugging of an impulse line of a pressure transmitter 140, according to an example embodiment. Step 201 comprises providing a pressure transmitter having an electronics housing 153 with a temperature sensor 143 generally therein, a pressure sensor 142 within a pressure case 141, where at least one impulse line 151, 152 couples the pressure sensor 142 to a tank 105 or fluid pipe 170 having a process fluid therein. The pressure sensor 142 is configured to measure a process pressure of the process fluid. The temperature sensor 143 is configured for sensing an ambient temperature, which is generally an integral temperature sensor 143 being within the electronics housing 153 that can continuously measure the air temperature around the pressure transmitter 140 which approximates the ambient temperature.

It may also be possible for the temperature sensor 143 to be external to the electronics housing 153. The pressure transmitter includes a processor 145 accessing baseline data 149 for the process pressure and ambient temperature stored memory 146. The processor 145 is coupled to an output of the pressure sensor 142 to receive the process pressure and to an output of the temperature sensor 143 to receive the ambient temperature and implement an automatic ILPD algorithm 147 stored in the memory 146.

Step 202 comprises obtaining process measurements including a process pressure measurement from the pressure sensor 142 and an ambient temperature measurement from the temperature sensor 143. Step 203 comprising the processor running the ILPD algorithm to implement utilizing the process measurements to compare a magnitude of a process pressure to a baseline pressure predicted from the baseline data corresponding to a magnitude of an ambient temperature. The comparing can comprise comparing a magnitude of a process pressure change to a baseline pressure change predicted from the baseline data corresponding to a magnitude of an ambient temperature change. Step 204 comprises using results of the comparing to determine whether the impulse line is plugged.

As noted above, the pressure transmitter includes a pressure sensor such as a gauge, absolute or differential pressure sensor. As known in the art a gauge pressure sensor measures the pressure relative to atmospheric pressure, while an absolute pressure sensor measures the pressure relative to perfect vacuum. A differential pressure sensor includes LP and HP impulse lines which includes a differential pressure sensor which measures the difference between two pressures, one connected to each side of the differential pressure sensor (e.g., diaphragm).

As described above, essentially plug-free baseline data relating the process pressure for the pressure transmitter as a function of ambient temperature can be obtained at the time of system installation or after cleaning the impulse line(s). Under conditions where the impulse line(s) have no occurrence of plugging, typical process pressure changes are measured under conditions of typical ambient temperature changes. The magnitude, direction (up or down), and rate of process pressure change can be recorded along with the corresponding magnitude direction (up or down), and rate of ambient temperature change.

Comparison against accurate baseline data allows disclosed methods to apply for either a hydraulic or a pneumatic process, as hydraulic processes are recognized to result in much higher magnitude pressure changes with ambient temperature changes as compared to a pneumatic process. In operation with one or both impulse lines plugged in the case of a differentia pressure transmitter, the magnitude and rate of pressure change will exceed the baseline change under equivalent magnitude and rate of ambient temperature change.

For example, if the process pressure change is significantly larger (e.g., by a predetermined amount) than the baseline process pressure change predicted for a given ambient temperature change, then a plugged impulse line is indicated. For example, assume the baseline process pressure change is "x" for an ambient temperature change of "y". Sometime later the ambient temperature change is "y" (essentially the baseline ambient temperature change), but process pressure change is now "10x" (10 times larger). This process pressure change being much larger in magnitude (as compared to a predetermined baseline pressure range for the given temperature change) than the baseline process pressure change for a given ambient temperature change can be used to indicate a plugged impulse line. Additionally, the direction of the pressure change will indicate which impulse line is plugged for a differential pressure transmitter.

EXAMPLES

Disclosed embodiments of the invention are further illustrated by the following specific Examples, which should not be construed as limiting the scope or content of this Disclosure in any way.

A typical application for a differential pressure transmitter is to measure differential pressure across an orifice plate to calculate flow. The HP input to the differential pressure transmitter will generally be connected to the upstream tap on the orifice plate and the LP input connected to the downstream tap of the orifice plate. The impulse lines can be accomplished using flexible tubing or by other couplers.

As noted above, if one or both impulse lines become plugged during process operation, the differential pressure transmitter will output an erroneous pressure value. When the impulse line plugs, it will trap the existing process media in the section of the line. For a hydraulic process, the trapped volume of liquid will dramatically change pressure as a function of changing ambient pressure. For typical (unplugged) operation, the differential pressure changes will be small as a function of changing ambient temperature. Significant or large pressure changes that are accompanied by similar change in ambient temperature are used to indicate a plugged impulse line. For example, disclosed ILPD algorithms can diagnose a plugged impulse line in a liquid process media by relating a significant pressure change to measured changes in ambient temperature, based on the tables for a differential pressure transmitter shown in FIGS. 3A, and gauge or absolute pressure-based transmitter shown in FIG. 3B.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A method of diagnosing impulse line plugging for a pressure transmitter, comprising:
    providing said pressure transmitter including a pressure case and at least one impulse line coupling said pressure transmitter to a fluid pipe or tank having a process fluid therein, said pressure transmitter including a pressure sensor in said pressure case configured to measure a process pressure of said process fluid, a temperature sensor for sensing an ambient temperature, and a processor accessing baseline data for said process pressure and said ambient temperature stored in at least one associated memory, said processor coupled to an output of said pressure sensor to receive said process pressure and to an output of said temperature sensor to receive said ambient temperature and implement an automatic impulse line plugging diagnostic (ILPD) algorithm stored in said associated memory;
    obtaining process measurements including of said process pressure from said pressure sensor and of said ambient temperature from said temperature sensor;
    wherein said processor runs said ILPD algorithm implementing:
        utilizing said process measurements, comparing a magnitude of said process pressure to a baseline pressure predicted from said baseline data corresponding to a magnitude of said ambient temperature, and
        using results of said comparing to determine whether said impulse line is plugged.

2. The method of claim 1, wherein said comparing comprises comparing a magnitude of a change in said process pressure (process pressure change) to a baseline pressure change predicted from said baseline data corresponding to a magnitude of a change in said ambient temperature (ambient temperature change).

3. The method of claim 2, further comprising calculating said magnitude of said process pressure change and said magnitude of said ambient temperature change.

4. The method of claim 1, wherein said pressure sensor is a gauge or an absolute pressure sensor.

5. The method of claim 2, wherein said pressure transmitter is a differential pressure transmitter having a low pressure (LP) and a high pressure (HP) impulse line, wherein said ILPD algorithm uses a direction of said process pressure change in relation to a direction of said ambient temperature change to indicate which of said LP impulse line and said HP impulse line is plugged.

6. The method of claim 1, wherein a process associated with said process fluid is a hydraulic process.

7. The method of claim 1, wherein a process associated with said process fluid is a pneumatic process.

8. The method of claim 1, wherein said fluid pipe or tank is a fluid pipe, and said impulse line is coupled to said fluid pipe by an orifice plate.

9. A pressure transmitter, comprising:
    a pressure case configured for at least one impulse line to couple said pressure transmitter to a fluid pipe or tank having a process fluid therein;
    a pressure sensor configured to measure a process pressure of said process fluid, a temperature sensor for sensing an ambient temperature, and a processor accessing baseline data for said process pressure and said ambient temperature stored in at least one associated memory, said processor coupled to an output of said pressure sensor to receive said process pressure and to an output of said temperature sensor to receive said ambient temperature and implement an automatic impulse line plugging diagnostic (ILPD) algorithm stored in said associated memory;
    wherein said processor runs said ILPD algorithm implementing:
        utilizing process measurements including of said process pressure from said pressure sensor and of said ambient temperature from said temperature sensor, comparing a magnitude of said process pressure to a baseline pressure predicted from said baseline data corresponding to a magnitude of said ambient temperature, and using results of said comparing to determine whether said impulse line is plugged.

10. The pressure transmitter of claim 9, wherein said comparing comprises comparing a magnitude of a change in said process pressure (process pressure change) to a baseline pressure change predicted from said baseline data corresponding to a magnitude of a change in said ambient temperature (ambient temperature change).

11. The pressure transmitter of claim 9, wherein said fluid pipe or tank is a fluid pipe, and said impulse line is coupled to said fluid pipe by an orifice plate.

12. The pressure transmitter of claim 10, wherein said ILPD algorithm includes code for calculating said magnitude of said process pressure change and said magnitude of said ambient temperature change.

13. The pressure transmitter of claim 8, wherein said pressure sensor is a gauge or an absolute pressure sensor.

14. The pressure transmitter of claim 10, wherein said pressure transmitter is a differential pressure transmitter having a low pressure (LP) and a high pressure (HP) impulse line, wherein said ILPD algorithm uses a direction of said process pressure change in relation to a direction of said ambient temperature change to indicate which of said LP impulse line and said HP impulse line is plugged.

15. A pressure transmitter, comprising:
a pressure case configured for at least one impulse line to couple said pressure transmitter to a fluid pipe or tank having a process fluid therein;
a pressure sensor configured to measure a process pressure of said process fluid, a temperature sensor for sensing an ambient temperature, and a processor accessing baseline data for said process pressure and said ambient temperature stored in at least one associated memory, said processor coupled to an output of said pressure sensor to receive said process pressure and to an output of said temperature sensor to receive said ambient temperature and implement an automatic impulse line plugging diagnostic (ILPD) algorithm stored in said associated memory;
wherein said processor runs said ILPD algorithm implementing:
utilizing process measurements including of said process pressure from said pressure sensor and of said ambient temperature from said temperature sensor, comparing a magnitude of a change in said process pressure (process pressure change) to a baseline pressure change predicted from said baseline data corresponding to a magnitude of a change in said ambient temperature (ambient temperature change), and
using results of said comparing to determine whether said impulse line is plugged.

* * * * *